(12) United States Patent
Koretsky et al.

(10) Patent No.: US 6,625,276 B1
(45) Date of Patent: Sep. 23, 2003

(54) METHOD AND CIRCUIT FOR DETECTING RING AND CALLER-ID SIGNALS

(75) Inventors: Victor Koretsky, Raanana (IL); Arnon Senderov, Petah Tikva (IL)

(73) Assignee: D.S.P. Group Ltd., Herzelia Pituach (IL)

( * ) Notice: Subject to any disclaimer, the term of this patent is extended or adjusted under 35 U.S.C. 154(b) by 0 days.

(21) Appl. No.: 09/447,441

(22) Filed: Nov. 22, 1999

(30) Foreign Application Priority Data

May 11, 1999 (IL) .................................................. 129886

(51) Int. Cl.[7] .............................................. H04M 3/00
(52) U.S. Cl. ...................... 379/372; 379/377; 379/382; 379/413.01
(58) Field of Search ................................ 379/372, 377, 379/380, 382, 386, 399.01, 413, 413.01, 418, 350, 351, 252

(56) References Cited

U.S. PATENT DOCUMENTS

| | | | | |
|---|---|---|---|---|
| 5,649,002 A | * | 7/1997 | Brady et al. ............ 379/142.01 |
| 5,771,281 A | * | 6/1998 | Batten, Jr. ................ 379/93.23 |
| 5,796,815 A | | 8/1998 | Guercio et al. |
| 5,901,219 A | * | 5/1999 | Cason ........................ 379/373 |
| 6,058,171 A | * | 5/2000 | Hoopes ................. 379/142.01 |
| 6,456,712 B1 | * | 9/2002 | Hein et al. ............. 379/399.01 |

* cited by examiner

*Primary Examiner*—Rexford Barnie
(74) *Attorney, Agent, or Firm*—Nath & Associates PLLC; Gary M. Nath; Marvin C. Berkowitz

(57) ABSTRACT

A method and circuit for distinguishing between a first voltage signal having a high amplitude and a second voltage signal having a low amplitude, the first and second voltage signals comprising respective AC components superimposed on a DC level. The DC level of the first and second voltage signals is blocked and the respective AC components of the first and second signals are attenuated by an attenuation factor which is voltage dependent and substantially frequency independent, so that the respective AC components of the first and second voltage signals after attenuation have similar amplitudes. The respective attenuated AC components of the first and second voltage signals are then processed so as to distinguish between the first and second voltage signals according to their respective frequencies.

9 Claims, 3 Drawing Sheets

METHOD AND CIRCUIT FOR DETECTING RING AND CALLER-ID SIGNALS

FIELD OF THE INVENTION

This invention relates to telephone ring and Caller ID detector circuits.

BACKGROUND OF THE INVENTION

So-called "smart telephones" are often provided with circuitry which decodes a Caller-ID signal sent by a central office between the first and second ring signals, so as to identify the calling party prior to answering the call. Typically, frequency-shift keying (FSK) encoded caller ID data is transmitted between first and second ring signals. The called party's telephone extension unit includes a detector, which demodulates the FSK signal and allows display of the Caller-ID before the called party answers the call.

U.S. Pat. No. 5,796,815 (Guercio et al.) discloses a communications device that is adapted to detect a ring and a Caller ID signal with the same detection circuitry. The communications device includes an off-hook detector coupled between a telephone line and a communications circuit. When the telephone is on-hook, an electrical resistance of at least 25 MΩ exists between two switch terminals of the off-hook detector, thereby effectively d.c. decoupling the telephone. A capacitor connected between the two switch terminals of the off-hook detector couples a.c. signals from the telephone line to the communications circuit when the telephone is on-hook. The ring signal has an amplitude of 100 volt peak to peak and a frequency in the range of 20 Hz. The Caller-ID signal has an amplitude of approximately 1 volt peak to peak and employs FSK using frequencies in the range of 1,200 Hz and 2,200 Hz to encode logic "1" and logic "0" respectively.

The value of the coupling capacitor is selected so that the amplitude of the ring signal is attenuated to approximately 1 volt peak to peak, this being the maximum allowable input voltage range of commonly available A/D converters. On the other hand, the amplitudes of the Caller-ID FSK frequencies are changed by no more than 5%. The signal amplitudes of both signals are thus brought into an overlapping range, allowing both signals to be detected with a single detector according to their respective frequencies.

There are several drawbacks with such an arrangement. First, the input impedance to the communications circuits series is substantially equivalent to a series combination of an inductance and a resistance. Together with the coupling capacitor, this forms an R-L-C high pass filter whose output is thus frequency dependent. The frequency of the ring signal varies from one country to another, typically lying within a range of 15 to 80 Hz. Thus, at the higher frequency range of the ring signal, the lower frequency of the FSK encoded Caller-ID signal is only fifteen times larger than the ring signal frequency. It is not possible, to attenuate an 80 Hz signal sufficiently using the coupling capacitor proposed by Guercio et al. to the same extent as may be done for a 20 HZ signal. Thus, effective translation of the ring and Caller-ID signals at all frequencies into the permitted range is impossible.

SUMMARY OF THE INVENTION

It is an object of the invention to provide a detector for detecting high voltage ring signal and the low voltage Caller-ID signal, wherein the drawbacks associated with hitherto-proposed circuits are eliminated.

According to a first aspect the invention, there is provided a method for distinguishing between a first voltage signal having a high amplitude and a second voltage signal having a low amplitude, said first and second voltage signals comprising respective AC components superimposed on a DC level, the method comprising the steps of:

(a) blocking the DC level of the first and second voltage signals,.

(b) attenuating the respective AC components of the first and second signals by an attenuation factor which is voltage dependent and substantially frequency independent, so that the respective AC components of the first and second voltage signals after attenuation have similar amplitudes, and (c) processing the attenuated respective AC components of the first and second voltage signals so as to distinguish between the first and second voltage signals according to their respective frequencies.

According to a second aspect of the invention, there is provided a circuit for distinguishing between a first voltage signal having a high amplitude and a second voltage signal having a low amplitude, said first and second voltage signals comprising respective AC components superimposed on a DC level, the circuit comprising:

a capacitor for blocking the DC level of the first and second voltage signals, an attenuator for attenuating the respective AC components of the first and second signals by an attenuation factor which is voltage dependent and substantially frequency independent, so that the respective AC components of the first and second voltage signals after attenuation have similar amplitudes, and a processor for processing the attenuated respective AC components of the first and second voltage signals so as to distinguish between the first and second voltage signals according to their respective frequencies.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF PREFERRED EMBODIMENTS

Figure 1:
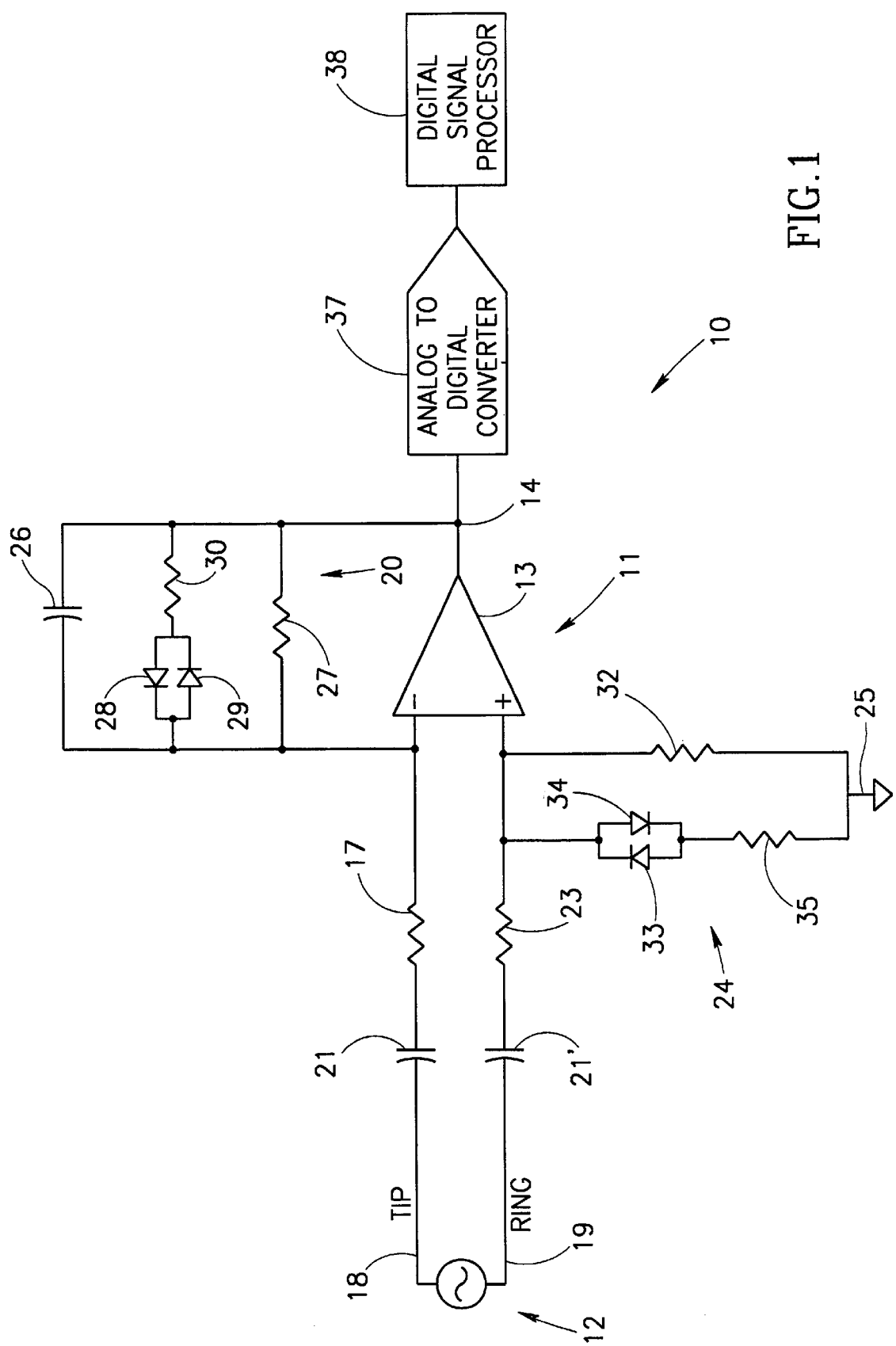
FIG. 1 is a schematic circuit diagram showing a detector circuit according to a first embodiment of the invention.

FIG. 1 is a schematic circuit diagram showing a detector circuit 10 employing a non-linear attenuator 11 to distinguish between ring and Caller-ID signals appearing across a telephone subscriber line shown generally as 12. The non-linear attenuator 11 comprises an operational amplifier 13 having an output terminal 14, an inverting input terminal 15 and a non-inverting input terminal 16. A first linear gain setting resistor 17 couples a TIP terminal 18 of the telephone subscriber line having a RING terminal 19 to the inverting input terminal 15 of the operational amplifier 13. A first non-linear gain setting resistor 20 is coupled between the inverting input terminal 15 and the output terminal 14 of the operational amplifier 13. The first non-linear gain setting resistor 20 shows a low resistance to a ring signal having high amplitude (constituting a first voltage signal) and a high resistance to a low amplitude Caller-ID signal (constituting a second voltage signal). The TIP terminal 18 constitutes a first voltage rail of a voltage source feeding the ring and Caller-ID signals. The non-linear attenuator 11 is AC coupled to telephone line Tip and Ring terminals 18 and 19, respectively, via respective DC blocking capacitors 21 and 21'.

In practice, the ring and Caller-ID signals are applied differentially by the central office between the TIP and RING terminals 18 and 19. Therefore, a symmetrical arrangement is provided wherein a second linear gain resistor 23 couples the RING terminal 19 to the non-inverting terminal 16 of the operational amplifier 13. Likewise, a second non-linear gain resistor 24 is coupled between the non-inverting input terminal 16 and a virtual ground connection 25 of the operational amplifier 13. The second non-linear gain setting resistor 24 shows a low resistance to the ring signal and a high resistance to the Caller-ID signal. A capacitor 26 is connected in parallel with the first non-linear gain setting resistor 20. The capacitor 26 in combination with the non-linear resistor 20 operates as a low-pass filter for diminishing spurious high frequency out-of-band signals. In order to ensure proper symmetry, the values of equivalent components associated with the TIP and RING terminals should be identical in value.

The first non-linear gain setting resistor 20 comprises a linear resistor 27 connected in parallel with a series connection of a pair of back-to-back rectifier diodes 28 and 29 and a linear resistor 30. Current flows through the linear resistor 30 when the voltage of the signal across the first non-linear gain setting resistor 20 exceeds the $V_{BE}$ breakdown voltage of the diode (equal to 0.7 volts for a silicon device). The two back-to-back rectifier diodes 28 and 29 ensure that under these conditions, current flows regardless of the polarity of the signal. In like manner, the second non-linear gain setting resistor 24 comprises a linear resistor 32 connected in parallel with a series connection of a pair of back-to-back rectifier diodes 33 and 34 and a linear resistor 35.

The output terminal 14 of the operational amplifier 13 is connected to an A/D converter 37 which converts the analog output signal to a digital equivalent, which is processed by a processor 38 connected to the A/D converter 37. The processor 38 is preferably a Digital Signal Processor (DSP).

The circuit operates as follows. The TIP and RING terminals 17 and 18, respectively, are connected to the telephone exchange, which feeds the ring and Caller-ID signals to the detector 10. The amplitude of the Caller-ID signal is less than the $V_{BE}$ threshold of the diodes 28, 29, 33 and 34, which therefore remain in their non-conductive state regardless of the polarity of the Caller-ID signal. Therefore, the first and second non-linear resistor presented to the Caller-ID signal is constituted by the linear resistor 27 and 32, respectively. On the other hand, the ring signal greatly exceeds the $V_{BE}$ threshold of the diodes 28, 29, 33 and 34, one of each pair of which therefore conducts depending on the polarity of the Caller-ID signal. Therefore, the first non-linear resistor presented to the ring signal is constituted by the parallel combination of the linear resistors 27 and 30. Likewise, the second non-linear resistor presented to the ring signal is constituted by the parallel combination of the linear resistors 32 and 35.

Figure 2A:
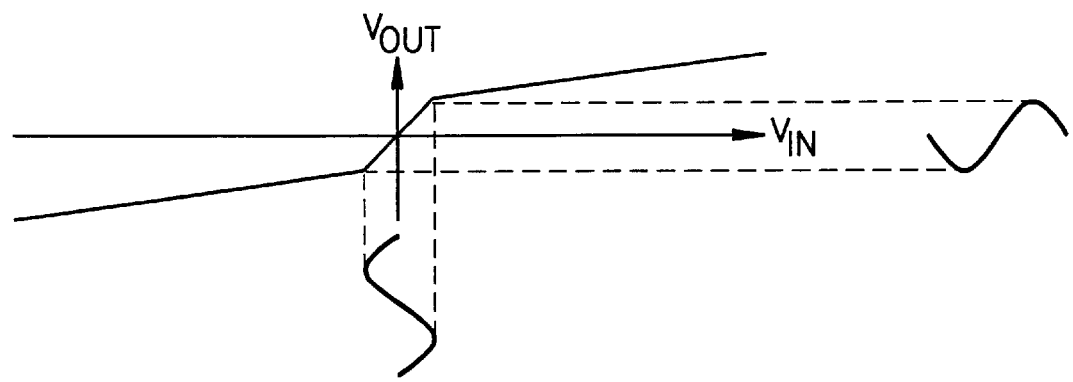
FIGS. 2a and 2b show graphically transient characteristics of the detector circuits according to the invention for small and large signals, respectively.
Figure 2B:
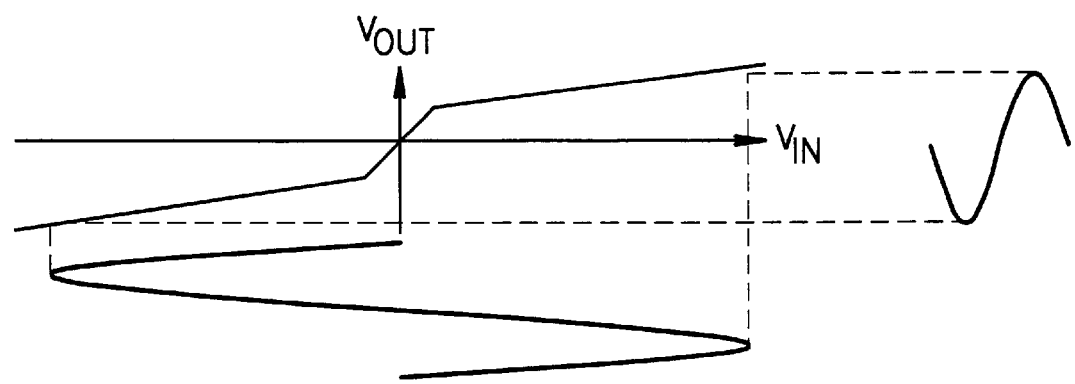

FIGS. 2a and 2b show graphically transient characteristics of the detector circuits according to the invention for low and high amplitude signals, respectively. It is seen that the attenuation (or amplification) factor is non-linear, comprising three linear sections: signal between Vbe and –Vbe, signal below –Vbe and above Vbe. In FIG. 2a, the low amplitude Caller-ID signals are attenuated by a low attenuation factor chosen to be around unity i.e. 0 dB. In FIG. 2b, the high amplitude ring signals are attenuated by a high attenuation factor chosen to be around –30 dB.

Figure 3:
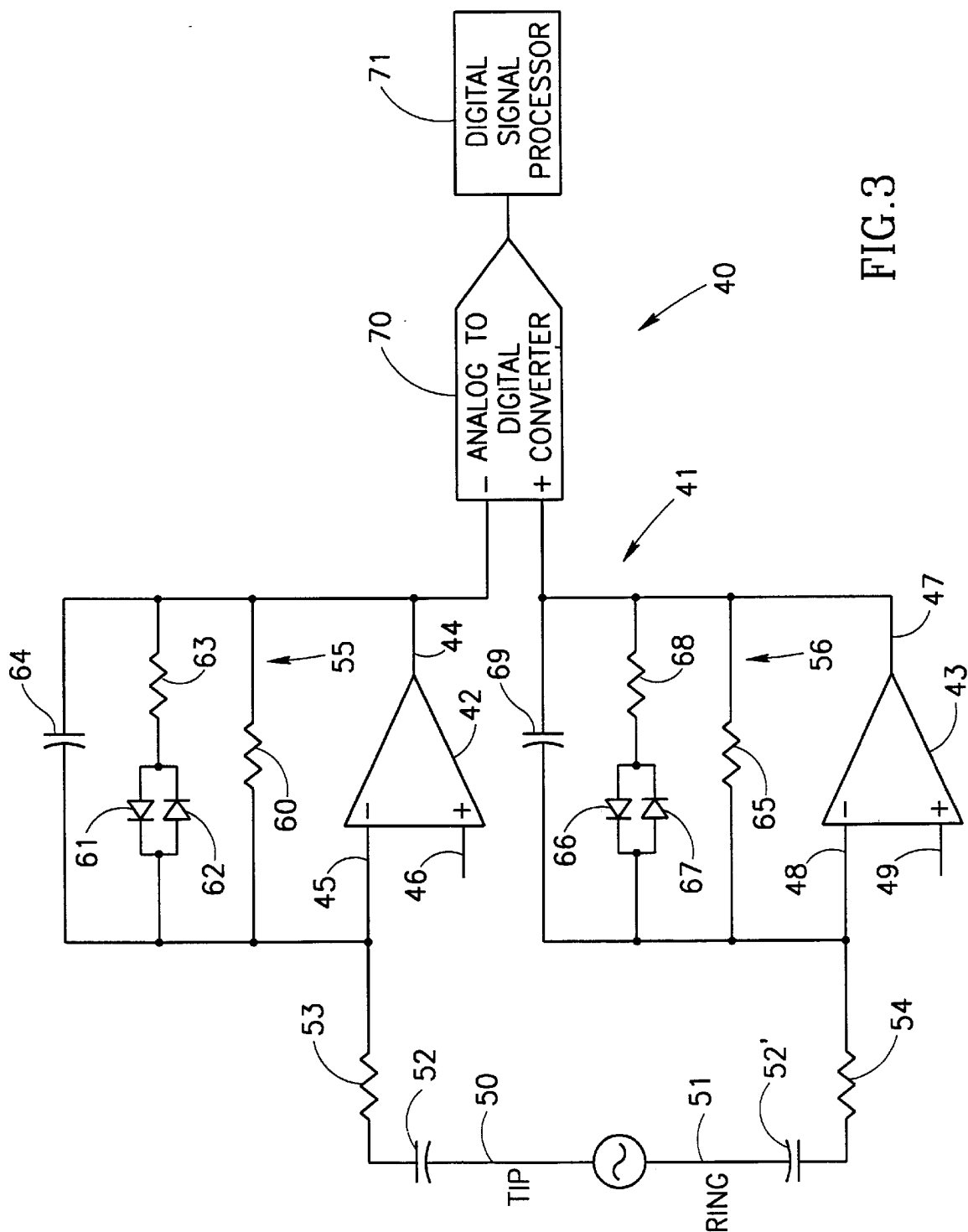
FIG. 3 is a schematic circuit diagram showing a detector circuit according to a second embodiment of the invention.

FIG. 3 is a schematic circuit diagram showing a different highly symmetrical implementation of the invention, especially suitable for integrated circuit utilization. A detector circuit 40 employs a non-linear attenuator 41, comprising first and second operational amplifiers 42 and 43. The first operational amplifier 42 has respective output, inverting input and non-inverting input terminals 44, 45 and 46. The second operational amplifier 43 has respective output, inverting input and non-inverting input terminals 47, 48 and 49.

The first and second operational amplifiers 42 and 43 are coupled to respective TIP and RING terminals 50 and 51 of a telephone exchange via respective first and second DC blocking capacitors 52 and 52' in series with first and second linear gain setting resistors 53 and 54, respectively. The TIP and RING terminals 50 and 51 constitute respective first and second voltage rails of a voltage source feeding the ring and Caller-ID signals to the respective inverting input terminals of the first and second operational amplifiers, via the first and second linear gain setting resistors 53 and 54, respectively.

A first non-linear gain setting resistor 55 is coupled between the inverting input terminal 45 and the output terminal 44 of the first operational amplifier 42 and has a low value to the high amplitude ring signal and a high value to the low amplitude Caller-ID signal. Likewise, a second non-linear gain setting resistor 56 is coupled between the inverting input terminal 48 and the output terminal 47 of the second operational amplifier 43 and has a low value to the high amplitude ring signal and a high value to the low amplitude Caller-ID signal.

The first non-linear gain setting resistor 55 comprises a linear resistor 60 connected in parallel with a series connection of a pair of back-to-back rectifier diodes 61 and 62 and a linear resistor 63. A capacitor 64 is connected in parallel with the first non-linear gain setting resistor 55. Current flows through the linear resistor 55 when the voltage of the signal across the first non-linear gain setting resistor 55 exceeds the $V_{BE}$ breakdown voltage of the diode (equal to 0.7 volts for a silicon device). The two back-to-back rectifier diodes 61 and 62 ensure that under these conditions, current flows regardless of the polarity of the signal. In like manner, the second non-linear gain setting resistor 56 comprises a linear resistor 65 connected in parallel with a series connection of a pair of back-to-back rectifier diodes 66 and 67 and a linear resistor 68. A capacitor 69 is connected in parallel with the first non-linear gain setting resistor 56. The capacitors 64 and 69 in combination with the respective non-linear resistors 55 and 56 operate as a low-pass filters for diminishing spurious high frequency out-of-band signals.

The respective output terminals 44 and 47 of the first and second operational amplifiers 42 and 43 are connected to an A/D converter 70 which converts the analog output signal to a digital equivalent, which is processed by a processor 71 connected to the A/D converter 70. The processor 71 is preferably a Digital Signal Processor (DSP).

In such an arrangement, the non-inverting terminals 46 and 49 of the first and second operational amplifiers are floating and take no part in the behavior of the attenuator 41. Each of the first and second operational amplifiers 42 and 43 has a non-linear attenuation depending on the amplitude of the respective signal fed thereto, according to which part of the transient characteristic shown in FIGS. 2a and 2b is operative.

Although the invention has been described with particular regard to distinguishing the Caller-ID signal from the ring signal, it can equally well be used as a mechanism to monitor a data signal on the line without going "off hook". The data signal may be any low amplitude signal representative of voice, music, facsimile or other analog data, which may be passed unattenuated for processing by the DSP.

It will be understood that the invention differs over hitherto-proposed circuits in that the attenuation factor is dependent on the voltage level of the incoming signals. Thus, providing there exists sufficient difference between the two signals, the larger of the two can be attenuated by a much greater factor than the other allowing both signals to pass to the A/D converter using a single detector only. Actual discrimination between the signals is then a function of some other characteristic, such as frequency, cadence and amplitude.

What is claimed is:

1. A circuit for distinguishing between a first voltage signal having a high amplitude and a second voltage signal having a low amplitude, said first and second voltage signals comprising respective AC components superimposed on a DC level, the circuit comprising:
   a capacitor for blocking the DC level of the first and second voltage signals,
   an attenuator for attenuating the respective AC components of the first and second signals by an attenuation factor which is voltage dependent and substantially frequency independent, so that the respective AC components of the first and second voltage signals after attenuation have similar amplitudes, and
   a processor for processing the attenuated respective AC components of the first and second voltage signals so as to distinguish between the first and second voltage signals according to their respective frequencies;
   wherein the attenuator comprises:
      an operational amplifier having an output terminal, an inverting input terminal and a non-inverting input terminal,
      a linear gain setting resistor for coupling a first voltage rail of a voltage source feeding the respective AC components of the first and second voltage signals to the inverting input terminal, and
      a non-linear gain setting resistor coupled between the inverting input terminal and the output terminal having a low value to the AC component of the high amplitude first voltage signal and a high value to the AC component of the low amplitude second voltage signal.

2. The circuit according to claim 1, wherein the attenuator further comprises a symmetrical pair of gain setting resistors associated with a second voltage rail of the voltage source.

3. A circuit for distinguishing between a first voltage signal having a high amplitude and a second voltage signal having a low amplitiude, said first and second voltage signals comprising respective AC components superimposed on a DC level the circuit comprising:
   a capacitor for blocking the DC level of the first and second voltage signals,
   an attenuator for attenuating the respective AC components of the first and second signals by an attenuation factor which is voltage dependent and substantially frequency independent, so that the respective AC components of the first and second voltage signals after attenuation have similar amplitudes, and
   a processor for processing the attenuated respective AC components of the first and second voltage signals so as to distinguish between the first and second voltage signals according to their respective frequencies;
   wherein the attenuator comprises:
      first and second operational amplifiers having respective output, inverting input and non-inverting input terminals,
      a first linear gain setting resistor for coupling a first voltage rail of a voltage source feeding the respective AC components of the first and second voltage signals to the inverting input terminal of the first operational amplifier,
      a second linear gain setting resistor for coupling a second voltage rail of a voltage source feeding the respective AC components of the first and second voltage signals to the inverting input terminal of the second operational amplifier,
      a first non-linear gain setting resistor coupled between the inverting input terminal and the output terminal of the first operational amplifier and having a low value to the AC component of the high amplitude first voltage signal and a high value to the AC component of the low amplitude second voltage signal, and
      a second non-linear gain setting resistor coupled between the inverting input terminal and the output terminal of the second operational amplifier and having a low value to the AC component of the high amplitude first voltage signal and a high value to the AC component of the low amplitude second voltage signal.

4. The circuit according to claim 1, wherein the non-linear gain setting resistor comprises a linear resistor connected in parallel with a series connection of a rectifier diode and a linear resistor.

5. The circuit according to claim 1, wherein the first and second voltage rails are tip and ring terminals, respectively, of a telephone subscriber line.

6. The circuit according to claim 1, followed by an A/D converter for converting an analog output signal to an equivalent digital signal.

7. The circuit according to claim 6, wherein said processor is a digital signal processor coupled to an output of the A/D converter.

8. The circuit according to claim 3, followed by an A/D converter for converting an analog output signal to an equivalent digital signal.

9. The circuit according to claim 8, wherein said processor is a digital signal processor coupled to an output of the AID converter.

* * * * *